United States Patent
Niemi et al.

(10) Patent No.: US 10,271,185 B1
(45) Date of Patent: Apr. 23, 2019

(54) METHOD AND APPARATUS FOR SHORT MESSAGE SERVICE RE-TRANSMISSION IN MOBILE COMMUNICATIONS

(71) Applicant: MediaTek Singapore Pte. Ltd., Singapore (SG)

(72) Inventors: Marko Niemi, Oulu (FI); Reijo Pyörälä, Jääli (FI)

(73) Assignee: MediaTek Singapore Pte. Ltd. (SG)

( * ) Notice: Subject to any disclaimer, the term of this patent is extended or adjusted under 35 U.S.C. 154(b) by 0 days.

(21) Appl. No.: 15/902,012

(22) Filed: Feb. 22, 2018

Related U.S. Application Data

(60) Provisional application No. 62/574,769, filed on Oct. 20, 2017, provisional application No. 62/579,929, filed on Nov. 1, 2017.

(51) Int. Cl.
| | |
|---|---|
| *H04W 4/00* | (2018.01) |
| *H04W 4/14* | (2009.01) |
| *H04B 1/38* | (2015.01) |

(52) U.S. Cl.
CPC .............. *H04W 4/14* (2013.01); *H04B 1/38* (2013.01)

(58) Field of Classification Search
CPC .................................. H04W 4/14; H04B 1/38
See application file for complete search history.

(56) References Cited

U.S. PATENT DOCUMENTS

| | | | |
|---|---|---|---|
| 9,749,821 B1 * | 8/2017 | Gupta ..................... | H04W 4/14 |
| 2011/0280383 A1 * | 11/2011 | Varga ...................... | H04W 4/14 |
| | | | 379/93.01 |
| 2013/0115982 A1 * | 5/2013 | Stojanovski ............ | H04L 51/30 |
| | | | 455/466 |
| 2015/0146593 A1 * | 5/2015 | Patil .................. | H04W 52/0225 |
| | | | 370/311 |
| 2017/0223768 A1 * | 8/2017 | Jain ....................... | H04L 1/1825 |

FOREIGN PATENT DOCUMENTS

| | | |
|---|---|---|
| CN | 101132260 A | 2/2008 |
| CN | 101562836 A | 10/2009 |
| CN | 101741524 A | 6/2010 |
| CN | 106412859 A | 2/2017 |

OTHER PUBLICATIONS

State Intellectual Property Office, International Search Report and Written Opinion for International Application No. PCT/CN2018/082471, dated Jul. 18, 2018.

* cited by examiner

*Primary Examiner* — Khai M Nguyen
(74) *Attorney, Agent, or Firm* — Han IP PLLC; Andy M. Han

(57) ABSTRACT

Various solutions for short message service re-transmission with respect to user equipment and network apparatus in mobile communications are described. An apparatus may transmit a control plane-data (CP-DATA) message for initiating mobile originated short message service (MO SMS). The apparatus may determine a first timer value for first transmission of the CP-DATA message. The apparatus may further re-transmit the CP-DATA message in response to expiration of the first timer value. The apparatus may further determine a second timer value for re-transmission of the CP-DATA message. The second timer value may be smaller than the first timer value.

20 Claims, 5 Drawing Sheets

METHOD AND APPARATUS FOR SHORT MESSAGE SERVICE RE-TRANSMISSION IN MOBILE COMMUNICATIONS

CROSS REFERENCE TO RELATED PATENT APPLICATION(S)

The present disclosure is part of a non-provisional application claiming the priority benefit of U.S. Patent Application No. 62/574,769, filed on 20 Oct. 2017 and U.S. Provisional Patent Application Ser. No. 62/579,929, filed on 1 Nov. 2017. The contents of the aforementioned patent documents are herein incorporated by reference in their entirety.

TECHNICAL FIELD

The present disclosure is generally related to mobile communications and, more particularly, to short message service re-transmission with respect to user equipment and network apparatus in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals. In addition, there are some newly developed next generation communication technologies such as 5th Generation (5G), New Radio (NR), Internet of Things (IoT) and Narrow Band Internet of Things (NB-IoT). These communication technologies are developed for higher speed transmission and serving for huge number of devices including machine type devices.

In some communication systems, short message service (SMS) may be provided for transmitting messages between the UE and the network apparatus. When transmitting the short messages, the signal transmission or the channel condition between the UE and the network apparatus may temporarily become bad or have some problems. The short message may not be well received at the other side or may be lost in the first transmission. However, the channel condition between the UE and the network apparatus may recover in a short time. Without proper re-transmission mechanisms, the short message service may be considered as failed or unsuccessful.

Accordingly, it is important for the UE and the network apparatus to properly perform short message re-transmission. Therefore, in developing communication systems, it is needed to provide proper mechanisms for the UE and the network apparatus to perform re-transmission for short message services.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to short message service re-transmission with respect to user equipment and network apparatus in mobile communications.

In one aspect, a method may involve an apparatus transmitting a control plane-data (CP-DATA) message for initiating mobile originated short message service (MO SMS). The method may also involve the apparatus determining a first timer value for first transmission of the CP-DATA message. The method may further involve the apparatus re-transmitting the CP-DATA message in response to expiration of the first timer value. The method may further involve the apparatus determining a second timer value for re-transmission of the CP-DATA message. The second timer value may be smaller than the first timer value.

In one aspect, an apparatus may comprise a transceiver capable of wirelessly communicating with a plurality of nodes of a wireless network. The apparatus may also comprise a processor communicatively coupled to the transceiver. The processor may be capable of transmitting a control plane-data (CP-DATA) message for initiating mobile originated short message service (MO SMS). The processor may also be capable of determining a first timer value for first transmission of the CP-DATA message. The processor may further be capable of re-transmitting the CP-DATA message in response to expiration of the first timer value. The processor may further be capable of determining a second timer value for re-transmission of the CP-DATA message. The second timer value may be smaller than the first timer value.

It is noteworthy that, although description provided herein may be in the context of certain radio access technologies, networks and network topologies such as Global System for Mobile communications (GSM), General Packet Radio Service (GPRS), Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to short message service re-transmission with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
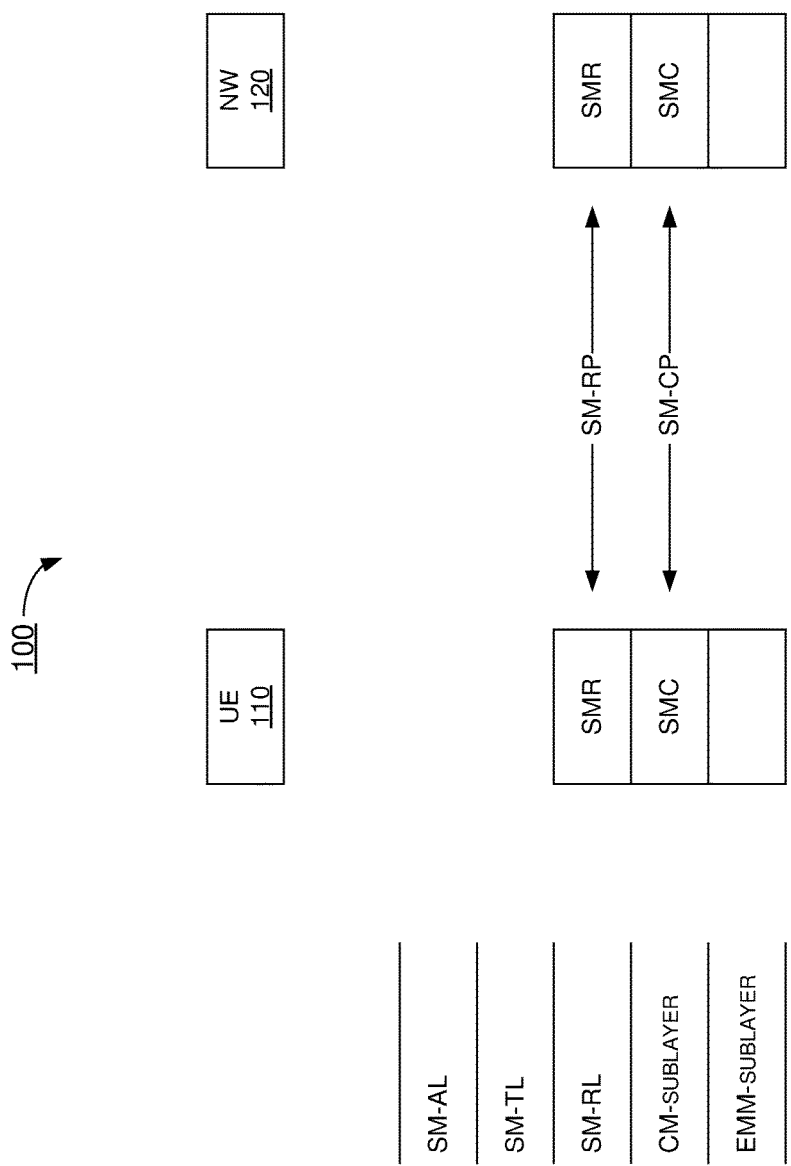
FIG. 1 is a diagram depicting an example protocol hierarchy under schemes in accordance with implementations of the present disclosure.

FIG. 1 illustrates an example protocol hierarchy 100 under schemes in accordance with implementations of the present disclosure. Protocol hierarchy 100 involves a user equipment (UE) 110 and a network apparatus 120, which may be a part of a wireless communication network (e.g., a Global System for Mobile communications (GSM) network, a General Packet Radio Service (GPRS) network, an Internet of Things (IoT) network or a Narrow Band Internet of Things (NB-IoT) network). UE 110 may be implemented as a mobile station (MS) or any other communication apparatus which may be capable of communicating with network apparatus 120. Network apparatus 120 may be implemented as a mobile switching center (MSC), a Serving GPRS Support Node (SGSN), a mobility management entity (MME) or any other network node. Protocol hierarchy 100 may be used to provide short message service (SMS) for transferring messages between UE 110 and network apparatus 120.

Protocol hierarchy 100 may comprise a Short Message Application Layer (SM-AL), a Short Message Transfer Layer (SM-TL), a Short Message Relay Layer (SM-RL), a Connection Management sublayer (CM-sub) and an EPS Mobility Management sublayer (EMM-sub). UE 110 may comprise a Short Message Relay (SMR) entity and a Short Message Control (SMC) entity. Network apparatus 120 may also comprise a SMR entity and a SMC entity. The protocol between the SMR entity in UE 110 and the SMR entity in network apparatus 120 may be denoted as Short Message Relay Protocol (SM-RP). The protocol between the SMC entity in UE 110 and the SMC entity in network apparatus 120 may be denoted as Short Message Control Protocol (SM-CP). Protocol hierarchy 100 may provide circuit-switched (CS) services or packet-switched (PS) services in at least one of a S1 mode, an A/Gb mode and an Iu mode.

Figure 2:
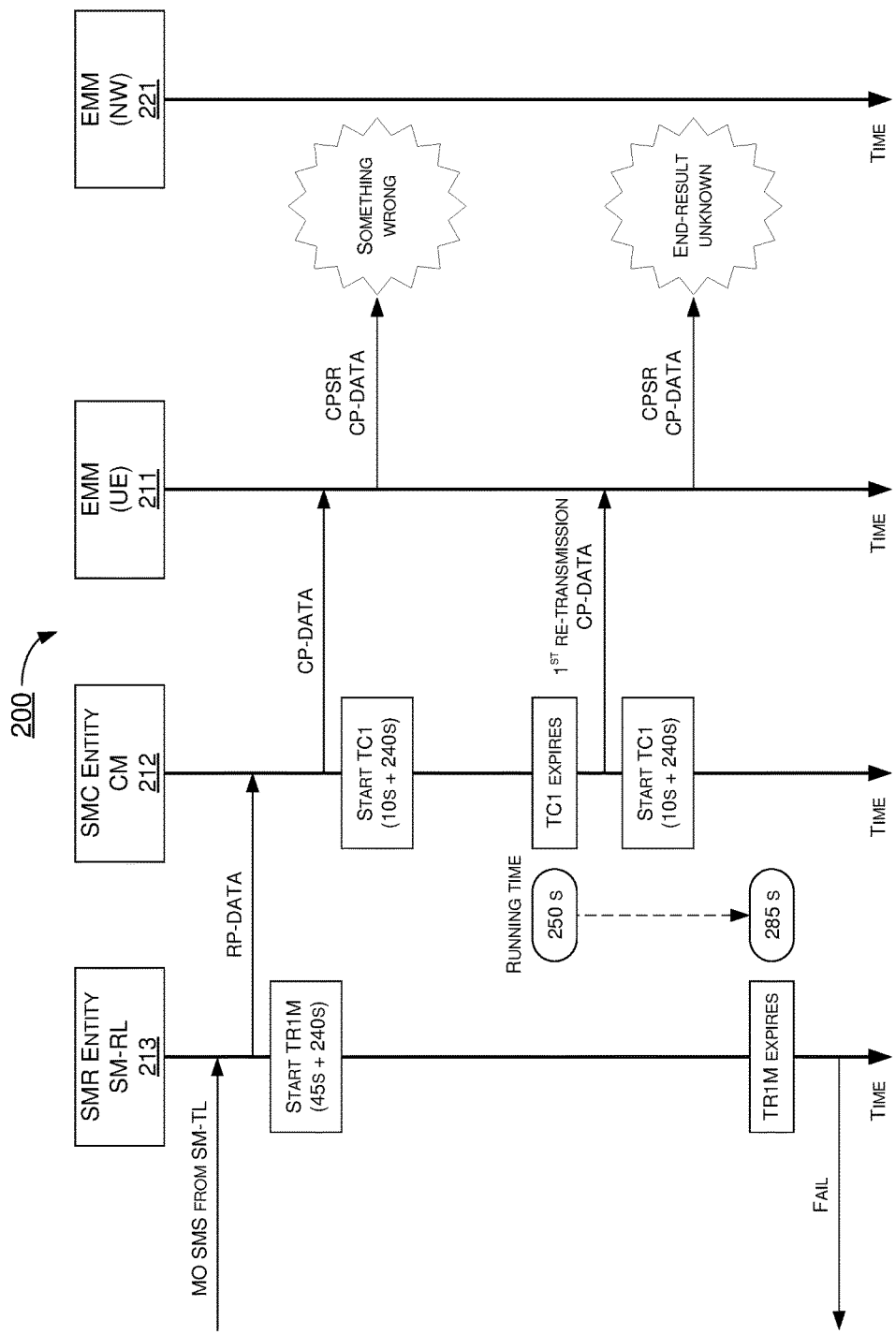
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network apparatus, which may be a part of a wireless communication network (e.g., a Global System for Mobile communications (GSM) network, a General Packet Radio Service (GPRS) network, an Internet of Things (IoT) network or a Narrow Band Internet of Things (NB-IoT) network). As showed in FIG. 2, the UE may comprise an EMM sublayer 211, a SMC entity 212 and a SMR entity 213. The network apparatus may comprise an EMM sublayer 221. The UE and the network may also comprise other entities or protocol layers as illustrated in FIG. 1 which may not be showed in FIG. 2. The UE may be configured to initiate mobile originated short message service (MO SMS). The SMR entity 213 may receive a MO SRS request from a higher layer (e.g., SM-TL). After receiving the MO SRS request, SMR entity 213 may transmit a relay protocol-data (RP-DATA) message to SMC entity 212. SMR entity 213 may be configured to determine a timer value for a timer TR1M for initiating the MO SMS. The timer value may be determined by increasing an extension value from a normal timer value. For example, the normal timer value may be 45 seconds and the extension value may be 240 seconds.

In response to receiving the RP-DATA message, SMC entity 212 may transmit a control plane-data (CP-DATA) message to EMM sublayer 211. SMC entity 212 may be configured to determine a timer value for a timer TC1 for the first transmission of the CP-DATA message. The timer value may be determined by increasing an extension value from a normal timer value. For example, the normal timer value may be 10 seconds and the extension value may be 240 seconds.

In response to receiving the CP-DATA message, EMM sublayer 211 may transmit a control plane service request (CPSR) message with the CP-DATA to EMM sublayer 221 at the network side. However, the signal transmission or channel condition between the UE and the network apparatus may have some problems. The CPSR message may not be transmitted to the network side successfully. Since the network apparatus may not receive the CPSR message and may not transmit a response message, the UE may keep waiting until expiration of the timer TC1. At this moment, the running time of the timer TC1 may reach 250 seconds.

In response to expiration of the timer TC1, SMC entity 212 may be configured to retransmit the CP-DATA message to EMM sublayer 211. EMM sublayer 211 may be configured to re-transmit the CPSR message to EMM sublayer 221 in response to the re-transmission. SMC entity 212 may be configured to initiate the timer TC1 again with the same timer value (e.g., 250 seconds) for the first re-transmission of the CP-DATA message. Assuming that the communication between the UE and the network apparatus still has problems, EMM sublayer 211 may still have to wait for the response from the network side.

Since the timer value of the timer TR1M is 285 seconds in this example, before expiration of the re-initiated timer TC1, the TR1M may expire first at the running time of 285 seconds. Once the timer TR1M is expired, SMR entity 213 may transmit a fail message to the upper layer (e.g., SM-TL). Although the first re-transmission may be still ongoing and there may be 220 seconds left in the timer TC1, the re-transmission will be stopped and terminated. The initiated MO SMS sending may be considered as failed or unsuccessful. Accordingly, due to the expiration of the timer TR1M, EMM sublayer 211 may have no chances to receive the response from the network side. On the other hand, SMC entity 212 may have only one chance to perform re-transmission of the CP-DATA message and have no time to wait for response from the network side. Since the timer values of TR1M and TC1 may not be compatible, such design may cause high fail-rate of the MO SMS.

Figure 3:
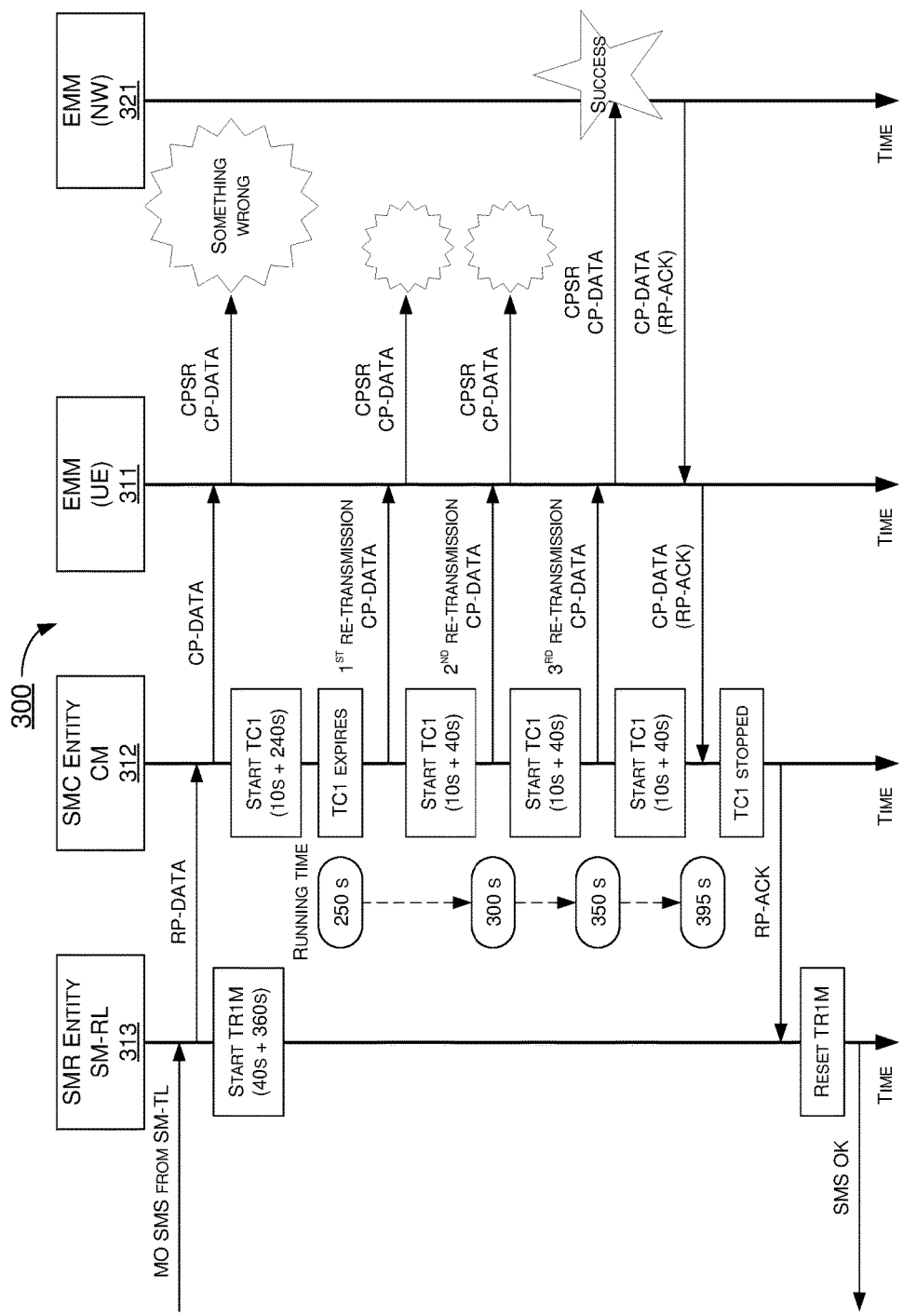
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network apparatus, which may be a part of a wireless communication network (e.g., a Global System for Mobile communications (GSM) network, a General Packet Radio Service (GPRS) network, an Internet of Things (IoT) network or a Narrow Band Internet of Things (NB-IoT) network). As showed in FIG. 3, the UE may comprise an EMM sublayer 311, a SMC entity 312 and a SMR entity 313. The network apparatus may comprise an EMM sublayer 321. The UE and the network may also comprise other entities or protocol layers as illustrated in FIG. 1 which may not be showed in FIG. 3. The UE may be configured to initiate MO SMS. The SMR entity 313 may receive a MO SRS request from a higher layer (e.g., SM-TL). After receiving the MO SRS request, SMR entity 313 may transmit a RP-DATA message to SMC entity 312. SMR entity 313 may be configured to determine a timer value for a timer TR1M for initiating the MO SMS. The timer value may be determined by increasing an extension value from a normal timer value. In this example, the normal timer value may be greater than 35 seconds and less than 45 seconds (e.g., 40 seconds) and the extension value may be increased to 360 seconds.

In response to receiving the RP-DATA message, SMC entity 312 may transmit a CP-DATA message to EMM sublayer 311. SMC entity 312 may be configured to determine a first timer value for a timer TC1 for the first transmission of the CP-DATA message. The first timer value may be determined by increasing an extension value from a normal timer value. In this example, the normal timer value may be 10 seconds and the extension value may be 240 seconds.

In response to receiving the CP-DATA message, EMM sublayer 311 may transmit a CPSR message with the CP-DATA to EMM sublayer 321 at the network side. Similarly, the signal transmission or channel condition between the UE and the network apparatus may have some problems. The CPSR message may not be transmitted to the network side successfully. Since the network apparatus may not receive the CPSR message and may not transmit a response message, the UE may keep waiting until expiration of the timer TC1. At this moment, the running time of the timer TC1 may reach 250 seconds.

In response to expiration of the timer TC1, SMC entity 312 may be configured to retransmit the CP-DATA message to EMM sublayer 311. EMM sublayer 311 may be configured to re-transmit the CPSR message to EMM sublayer 321 in response to the re-transmission. SMC entity 312 may be configured to determine a second timer value for the timer TC1 for the first re-transmission of the CP-DATA message. The second timer value may be determined by increasing an extension value from a normal timer value. For example, the normal timer value may be 10 seconds and the extension value may be 40 seconds. The second timer value (e.g., 50 seconds) may be different from the first timer value and may be smaller than the first timer value (e.g., 250 seconds).

Assuming that the communication between the UE and the network apparatus still has problems, EMM sublayer 311 may still not receive the response from the network side. After the second timer value (e.g., 50 seconds), the timer TC may expire again. At this moment, the running time of the timer TC1 may accumulate to 300 seconds. Since the timer TR1M is still running, SMC entity 312 may be further configured to perform a second re-transmission of the CP-DATA message to EMM sublayer 311. EMM sublayer 311 may be configured to re-transmit the CPSR message to EMM sublayer 321 in response to the second re-transmission. SMC entity 312 may be configured to initiate the timer TC1 with the second timer value (e.g., 50 seconds) again for the second re-transmission of the CP-DATA message.

Similarly, in an event that the communication between the UE and the network apparatus still has problems, EMM sublayer 311 may still not receive the response from the network side. After the second timer value (e.g., 50 seconds), the timer TC may expire again. At this moment, the running time of the timer TC1 may accumulate to 350 seconds. Since the timer TR1M is still running, SMC entity 312 may be further configured to perform a third re-transmission of the CP-DATA message to EMM sublayer 311. EMM sublayer 311 may be configured to re-transmit the CPSR message to EMM sublayer 321 in response to the third re-transmission. SMC entity 312 may be configured to initiate the timer TC1 with the second timer value (e.g., 50 seconds) again for the third re-transmission of the CP-DATA message.

In the third re-transmission, the communication between the UE and the network apparatus may be recovered and EMM sublayer 321 at the network side may receive the CPSR message successfully. After receiving the CPSR message, EMM sublayer 321 may be configured to transmit a response message (e.g., CP-DATA message) with relay protocol-acknowledge (RP-ACK) to EMM sublayer 311 at the UE side. After receiving the response message, EMM sublayer 311 may transmit the response message to SMC entity 312. After receiving the response message, SMC entity 312 may be configured to stop the timer TC1. At this moment, the running time of the timer TC1 may accumulate to 395 seconds. SMC entity 312 may be further configured to transmit the RP-ACK to SMR entity 313. After receiving the RP-ACK, SMR entity 313 may be configured to stop or reset the timer TR1M and transmit a response message (e.g., SMS OK) to the upper layer (e.g., SM-TL). Then, the initiated MO SMS sending may be considered as successful.

By such design, the timer values of TR1M and TC1 may be compatible and aligned. The timer value of TR1M may be extended or the timer value of TC1 for re-transmission may be shortened. Therefore, before the expiration of the timer TR1M in SMR entity 313, SMC entity 312 may have enough time to perform re-transmissions and wait for response from the network side. Accordingly, such design may allow maximum three entire CP-DATA re-transmissions before expiration of the timer TR1M. The fail-rate of the MO SMS may be reduced.

In some implementations, the timer value of the timer TR1M may be configured by 2 or 3 times longer than the timer value of the timer TC1 no matter what the common extension timer value is configured (e.g., 240 seconds). For example, in an event that the timer TC1 is determined to be 250 seconds (10 seconds+240 seconds), the timer TR1M may be extended to 500 seconds (e.g., 250 seconds+250 seconds) for allowing at least two CP-DATA re-transmissions.

Illustrative Implementations

Figure 4:
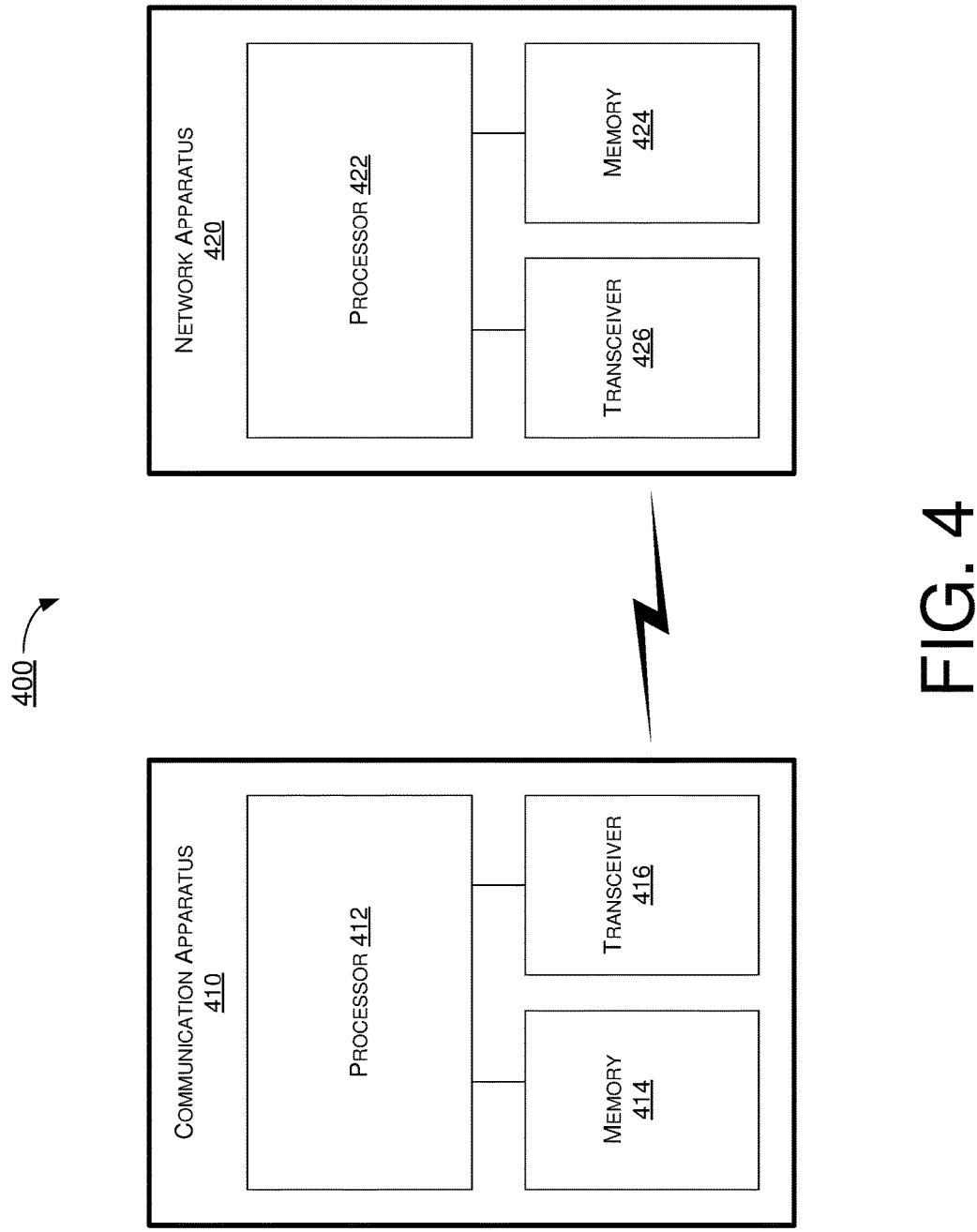
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to short message service re-transmission with respect to user equipment and network apparatus in wireless communications, including scenarios 200 and 300 described above as well as process 500 described below.

Communication apparatus 410 may be a part of an electronic apparatus, which may be a user equipment (UE) or a mobile station (MS) such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, or one or more complex-instruction-set-computing (CISC) processors. Communication apparatus 410 may include at least some of those components shown in FIG. 4 such as a processor 412, for example. communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router, a gateway, a mobile switching center (MSC), a Serving GPRS Support Node (SGSN) or a mobility management entity (MME). For instance, network apparatus 420 may be implemented in a base station in a GSM or GPRS network, in an eNodeB in a LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, or one or more CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, each of processor 412 and processor 422 may comprise a protocol hierarchy which may comprise a Short Message Application Layer (SM-AL), a Short Message Transfer Layer (SM-TL), a Short Message Relay Layer (SM-RL), a Connection Management sublayer (CM-sub) and an EPS Mobility Management sublayer (EMM-sub). The protocol hierarchy may be used to provide circuit-switched (CS) services or packet-switched (PS) services in at least one of a S1 mode, an A/Gb mode and an Iu mode. Each of processor 412 and processor 422 may further comprise a Short Message Relay (SMR) entity, a Short Message Control (SMC) entity or other entities. The protocol hierarchy, the SMR entity, the SMC entity or the other entities may be implemented in software or hardware in each of processor 412 and processor 422.

In some implementations, processor 412 may be configured to initiate mobile originated short message service (MO SMS). Processor 412 may configure the SMR entity to receive a MO SRS request from a higher layer (e.g., SM-TL). After receiving the MO SRS request, processor 412 may configure the SMR entity to transmit a relay protocol-data (RP-DATA) message to the SMC entity. Processor 412 may configure the SMR entity to determine a timer value for a timer TR1M for initiating the MO SMS. Processor 412 may determine the timer value by increasing an extension value from a normal timer value. For example, the normal timer value may be greater than 35 seconds and less than 45 seconds (e.g., 40 seconds) and the extension value may be increased to 360 seconds.

In some implementations, processor 412 may configure the SMC entity to transmit a CP-DATA message to the EMM sublayer. Processor 412 may configure the SMC entity to determine a timer value for a timer TC1 for the first transmission of the CP-DATA message. Processor 412 may determine the timer value by increasing an extension value from a normal timer value. For example, the normal timer value may be 10 seconds and the extension value may be 240 seconds.

In some implementations, processor 412 may configure the EMM sublayer to transmit a CPSR message with the CP-DATA to the EMM sublayer in network apparatus 420. However, the signal transmission or channel condition between communication apparatus 410 and network apparatus 420 may have some problems. The CPSR message may not be transmitted to network apparatus 420 successfully. Since network apparatus 420 may not receive the CPSR message and may not transmit a response message, processor 412 may keep waiting until expiration of the timer TC1. For example, the running time of the timer TC1 may reach 250 seconds.

In some implementations, processor 412 may configure the SMC entity to retransmit the CP-DATA message the EMM sublayer in response to expiration of the timer TC1. Processor 412 may configure the EMM sublayer to re-transmit the CPSR message to the EMM sublayer in network apparatus 420 in response to the re-transmission. Processor 412 may configure the SMC entity to determine a second timer value for the timer TC1 for the first re-transmission of the CP-DATA message. Processor 412 may determine the second timer value by increasing an extension value from a normal timer value. For example, the normal timer value may be 10 seconds and the extension value may be 40 seconds. The second timer value (e.g., 50 seconds) may be different from the first timer value and may be smaller than the first timer value (e.g., 250 seconds).

In some implementations, processor 412 may still not receive the response from network apparatus 420 since the communication between communication apparatus 410 and network apparatus 420 may still have problems. After the second timer value (e.g., 50 seconds), the timer TC may expire again. At this moment, the running time of the timer TC1 may accumulate to 300 seconds. Since the timer TR1M is still running, processor 412 may further configure the SMC entity to perform a second re-transmission of the CP-DATA message to the EMM sublayer. Processor 412 may further configure the EMM sublayer 311 to re-transmit the CPSR message to the EMM sublayer in network apparatus 420. Processor 412 may configure the SMC entity to initiate the timer TC1 with the second timer value (e.g., 50 seconds) again for the second re-transmission of the CP-DATA message.

In some implementations, processor 412 may still not receive the response from network apparatus 420 since the communication between communication apparatus 410 and network apparatus 420 may still have problems. After the second timer value (e.g., 50 seconds), the timer TC may expire again. At this moment, the running time of the timer TC1 may accumulate to 350 seconds. Since the timer TR1M is still running, processor 412 may further configure the SMC entity to perform a third re-transmission of the CP-DATA message to the EMM sublayer. Processor 412 may further configure the EMM sublayer 311 to re-transmit the CPSR message to the EMM sublayer in network apparatus 420. Processor 412 may configure the SMC entity to initiate the timer TC1 with the second timer value (e.g., 50 seconds) again for the third re-transmission of the CP-DATA message.

In some implementations, the communication between communication 410 and network apparatus 420 may be recovered and the EMM sublayer in network apparatus 420 may receive the CPSR message successfully. After receiving the CPSR message, processor 422 may configure the EMM sublayer to transmit a response message (e.g., CP-DATA message) with relay protocol-acknowledge (RP-ACK) to the EMM sublayer in communication apparatus 410. After receiving the response message, processor 412 may configure the EMM sublayer to transmit the response message to the SMC entity. Processor 412 may configure the SMC entity 312 to stop the timer TC1. At this moment, the running time of the timer TC1 may accumulate to 395 seconds. Processor 412 may configure the SMC entity to transmit the RP-ACK to the SMR entity. Processor 412 may further configure the SMR entity to stop or reset the timer TR1M and transmit a response message (e.g., SMS OK) to the upper layer (e.g., SM-TL). Then, the initiated MO SMS sending may be considered as successful.

In some implementations, processor 412 may configure the timer value of the timer TR1M to be 2 or 3 times longer than the timer value of the timer TC1 no matter what the common extension timer value is configured (e.g., 240 seconds). For example, in an event that processor 412 determines the timer TC1 to be 250 seconds (10 seconds+ 240 seconds), processor 412 may extend the timer TR1M to 500 seconds (e.g., 250 seconds+250 seconds) for allowing at least two CP-DATA re-transmissions.

Illustrative Processes

Figure 5:
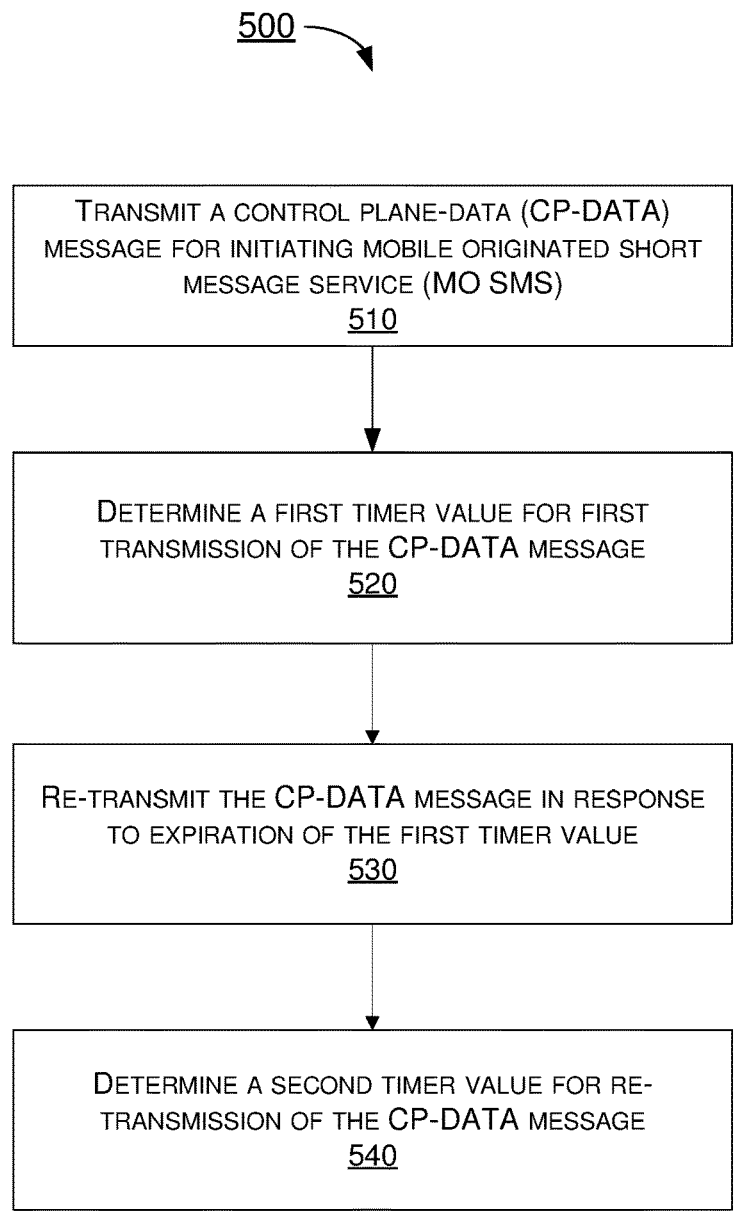
FIG. 5 is a flowchart of an example process in accordance with an implementation of the present disclosure.

FIG. 5 illustrates an example process 500 in accordance with an implementation of the present disclosure. Process 500 may be an example implementation of scenarios 200 and 300, whether partially or completely, with respect to short message service re-transmission in accordance with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve communication apparatus 410 transmitting a control plane-data (CP-DATA) message for initiating mobile originated short message service (MO SMS). Process 500 may proceed from 510 to 520.

At 520, process 500 may involve communication apparatus 410 determining a first timer value for first transmission of the CP-DATA message. Process 500 may proceed from 520 to 530.

At 530, process 500 may involve communication apparatus 410 re-transmitting the CP-DATA message in response to expiration of the first timer value. Process 500 may proceed from 530 to 540.

At 540, process 500 may involve communication apparatus 410 determining a second timer value for re-transmission of the CP-DATA message. The second timer value may be smaller than the first timer value.

In some implementations, the first timer value may be determined by increasing a first extension value from a normal timer value. The second timer value may be determined by increasing a second extension value from the normal timer value.

In some implementations, the first timer value may comprise 250 seconds. The second timer value may comprise 50 seconds.

In some implementations, the first timer value or the second timer value may be determined for a timer TC1. The first timer value or the second timer value may be determined in a short message control (SMC) entity.

In some implementations, process 500 may involve communication apparatus 410 determining a third timer value for initiating the MO SMS. Process 500 may further involve communication apparatus 410 re-transmitting the CP-DATA message three times before the expiration of the third timer value.

In some implementations, the third timer value may be determined by increasing an extension value from a normal timer value. The third timer value may be determined for a timer TR1M. The third timer value may comprise 395 seconds to 405 seconds. The third timer value may be determined in a short message relay function (SM-RL).

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of an apparatus, a control plane-data (CP-DATA) message for initiating mobile originated short message service (MO SMS);
   determining, by the processor, a first timer value for first transmission of the CP-DATA message;
   re-transmitting, by the processor, the CP-DATA message in response to expiration of the first timer value; and
   determining, by the processor, a second timer value for re-transmission of the CP-DATA message,
   wherein the second timer value is smaller than the first timer value, and
   wherein a sum of the first timer value and the second timer value is less than a timer value of a timer for initiating the MO SMS such that there is time for two or more re-transmissions before expiration of the timer for initiating the MO SMS.

2. The method of claim 1, wherein the first timer value is determined by increasing a first extension value from a normal timer value, and wherein the second timer value is determined by increasing a second extension value from the normal timer value.

3. The method of claim 1, wherein the first timer value comprises 250 seconds, and wherein the second timer value comprises 50 seconds.

4. The method of claim 1, wherein the first timer value or the second timer value is determined for a timer TC1.

5. The method of claim 1, wherein the first timer value or the second timer value is determined in a short message control (SMC) entity.

6. The method of claim 1, further comprising:
   determining, by the processor, a third timer value for initiating the MO SMS; and
   re-transmitting, by the processor, the CP-DATA message three times before the expiration of the third timer value.

7. The method of claim 6, wherein the third timer value is determined by increasing an extension value from a normal timer value.

8. The method of claim 6, wherein the third timer value is determined for a timer TR1M.

9. The method of claim 6, wherein the third timer value comprises 395 seconds to 405 seconds.

10. The method of claim 6, wherein the third timer value is determined in a short message relay function (SM-RL).

11. An apparatus, comprising:
    a transceiver capable of wirelessly communicating with a plurality of nodes of a wireless network; and
    a processor communicatively coupled to the transceiver, the processor capable of:
    transmitting, via the transceiver, a control plane-data (CP-DATA) message for initiating mobile originated short message service (MO SMS);
    determining a first timer value for first transmission of the CP-DATA message;
    re-transmitting, via the transceiver, the CP-DATA message in response to expiration of the first timer value; and
    determining a second timer value for re-transmission of the CP-DATA message,
    wherein the second timer value is smaller than the first timer value, and
    wherein a sum of the first timer value and the second timer value is less than a timer value of a timer for initiating the MO SMS such that there is time for two or more re-transmissions before expiration of the timer for initiating the MO SMS.

12. The apparatus of claim 11, wherein the first timer value is determined by increasing a first extension value from a normal timer value, and wherein the second timer value is determined by increasing a second extension value from the normal timer value.

13. The apparatus of claim 11, wherein the first timer value comprises 250 seconds, and wherein the second timer value comprises 50 seconds.

14. The apparatus of claim 11, wherein the first timer value or the second timer value is determined for a timer TC1.

15. The apparatus of claim 11, wherein the first timer value or the second timer value is determined in a short message control (SMC) entity.

16. The apparatus of claim 11, wherein the processor is further capable of:
    determining a third timer value for initiating the MO SMS; and
    re-transmitting, via the transceiver, the CP-DATA message three times before the expiration of the third timer value.

17. The apparatus of claim 16, wherein the third timer value is determined by increasing an extension value from a normal timer value.

18. The apparatus of claim 16, wherein the third timer value is determined for a timer TR1M.

19. The apparatus of claim 16, wherein the third timer value comprises 395 seconds to 405 seconds.

20. The apparatus of claim 16, wherein the third timer value is determined in a short message relay function (SM-RL).

* * * * *